United States Patent
Berntsen et al.

(10) Patent No.: US 9,608,793 B2
(45) Date of Patent: Mar. 28, 2017

(54) METHOD AND SYSTEM FOR MARITIME HIGH SPEED BROADBAND COMMUNICATION NETWORKING

(75) Inventors: Per Christian Berntsen, Trondheim (NO); Arne Rinnan, Ranheim (NO); Harald Fossum Rosshaug, Oppdal (NO)

(73) Assignee: Kongsberg Seatex AS, Trondheim (NO)

( * ) Notice: Subject to any disclaimer, the term of this patent is extended or adjusted under 35 U.S.C. 154(b) by 532 days.

(21) Appl. No.: 14/116,391

(22) PCT Filed: May 16, 2012

(86) PCT No.: PCT/NO2012/050091
§ 371 (c)(1),
(2), (4) Date: Nov. 8, 2013

(87) PCT Pub. No.: WO2012/158046
PCT Pub. Date: Nov. 22, 2012

(65) Prior Publication Data
US 2014/0086191 A1   Mar. 27, 2014

(30) Foreign Application Priority Data
May 16, 2011  (NO) .................................. 20110727

(51) Int. Cl.
*H04L 5/00* (2006.01)
*H04B 7/04* (2006.01)
(Continued)

(52) U.S. Cl.
CPC ............. *H04L 5/0058* (2013.01); *H01Q 1/34* (2013.01); *H01Q 3/30* (2013.01); *H04B 7/0408* (2013.01);
(Continued)

(58) Field of Classification Search
CPC .......... H01Q 1/34; H01Q 3/30; H04L 5/0058; H04B 7/10; H04B 7/18506; H04B 7/0408
See application file for complete search history.

(56) References Cited

U.S. PATENT DOCUMENTS

2005/0175009 A1* 8/2005 Bauer ................. H04L 12/2854 370/390
2009/0315776 A1* 12/2009 Khosravy ............... G01S 19/49 342/452

(Continued)

FOREIGN PATENT DOCUMENTS

WO     2007018790 A1   2/2007
WO   WO 2007/018790   *  2/2007

OTHER PUBLICATIONS

Kumar, Sukanta, H. et al., "Efficient Neighbour Discovery Algorithm for Maritime Mesh Networks with Directional Antennas," ITS Telecommunications, 2008; ITST 2008; 8th International Conference, Piscataway, NJ, USA.*

(Continued)

*Primary Examiner* — Redentor Pasia
(74) *Attorney, Agent, or Firm* — Alix, Yale & Ristas, LLP

(57) ABSTRACT

Method and system for providing an integrated long range, high capacity communication system between several entities involved in maritime Simultaneous Operations (SI-MOPS). The method and system makes use of narrow lobe phase steerable antenna being controllable in both azimuth and elevation by software control.

31 Claims, 6 Drawing Sheets

(51) Int. Cl.
| | |
|---|---|
| H04B 7/10 | (2006.01) |
| H01Q 1/34 | (2006.01) |
| H01Q 3/30 | (2006.01) |
| H04B 7/06 | (2006.01) |
| H04W 4/02 | (2009.01) |
| H04B 7/0408 | (2017.01) |

(52) U.S. Cl.
CPC ............ *H04B 7/10* (2013.01); *H04B 7/0617* (2013.01); *H04W 4/02* (2013.01)

(56) References Cited

U.S. PATENT DOCUMENTS

| | | | | |
|---|---|---|---|---|
| 2011/0032149 | A1* | 2/2011 | Leabman | H01Q 1/246 342/368 |
| 2011/0088003 | A1* | 4/2011 | Swink | H04L 51/32 715/863 |
| 2012/0076007 | A1* | 3/2012 | Nelson | H04W 52/24 370/252 |
| 2014/0341027 | A1* | 11/2014 | Chen | H04L 41/5022 370/232 |

OTHER PUBLICATIONS

International Search Report and Written Opinion dated Jan. 17, 2013 (PCT/NO2012/050091).

International Preliminary Report on Patentability dated May 14, 2013 (PCT/NO2012/050091).

Chahbi, Ismehene et al., "Improving Performance of Ad Hoc and Vehicular Networks Using the LCMV Beamformer," Wireless and Mobile Computing, Networking and Communications, 2009; WIMOB 2009; IEEE International Conference, Piscataway, NJ, USA.

Kim, YoungBum et al., "Application Scenarios of Nautical Ad Hoc Network for Maritime Communications," Inha University, Republic of Korea.

* cited by examiner

METHOD AND SYSTEM FOR MARITIME HIGH SPEED BROADBAND COMMUNICATION NETWORKING

BACKGROUND

In maritime Simultaneous Operations (SIMOPS), efficient and secure communication between the involved parties is of vital importance. The communication systems in use today is mainly standard VHF and satellite communication which needs to be coordinated between the parties before the operation. VHF communication is a proven method of speech communication, but does not support the high data rates that is necessary in complex operation involving DP systems, electronic chart systems (ECS, ECDIS) and computer controlled decision support systems. Satellite communication may support high data rates, but it often introduces unwanted delays in the communication chain. Today's complex SIMOPS therefore require a long range, high speed data communication system tailored to integrate a large number of data communication sources and supporting live video from the entities involved.

Off the shelf broadband networks are not well suited for SIMOPS environments due to short range and low resistance to interference. The capacity of such networks is also too low to support the demanding applications found in SIMOPS. Moreover, such units are not optimized for transmission over sea which may heavily degrade their performance.

GB2448510 A discloses a radio frequency communication method, apparatus or system which comprises a first antenna which transmits information regarding its location to a second antenna which receives the said information and uses it to align a directional radiation beam from the second antenna towards the location of the first antenna. The publication describes a lobe-aligning system based on switching antennas between omnidirectional antennas transmitting location information and highly directive antennas which are used for communication purposes. Even if alignment is achieved, the dual antenna approach is complex and expensive. The use of omnidirectional antennas will also limit the system range as they have zero antenna gain. Even if transmission speed is lowered to overcome this problem, this system will never perform as good as a system with high antenna gain for both location and data transmission.

US2005176372A discloses a highly integrated reliable architectural radio system for maritime application. Especially, US2005176372A relates to a wireless unlicensed band radio system for use in maritime applications which comprise three sector antennas providing a minimum of 120 degrees coverage (3 dB point) which combine to achieve 360 degrees of continuous coverage. The publication describes the use of standard WLAN equipment in a configuration where separate units are used for covering separate sectors. Standard WLAN equipment is not well suited for use over open sea paths where sea reflections will contribute to deep nulls, low signal to noise ratio and inter-system interference problems. Moreover, standard WLAN equipment has reduced capacity when several users are logged on the network. As reflections and interference signals are to be expected in marine environments, the standard WLAN approach will normally not meet the demanding requirements in SIMOPS.

US2002169527 discloses a method and system for a marine vessel tracking system. Especially, US2002169527 relates to automatic marine ship tracking systems and methods. More particularly, this disclosure relates to ship tracking systems and methods for accurately monitoring the movement of marine ships utilizing a limited number of transmissions from the marine ships. The publication describes a simple tracking system based on GPS and wireless transmission of position data to a central control unit. The vessels only report when a major shift in position from the last report is observed. The control unit extrapolates the position data and can pinpoint the position of the vessel with some accuracy. The described system is not sufficient for the position data rate needed in SIMOPS. As SIMOPS is characterized by vessels and structures close to each other, the position update must be close to real time. Data capacity and speed is therefore highly important. SIMOPS communications must in addition be virtual, as will be described in the present application.

US2006276992 describes a segmented antenna system for offshore radio networks and a method of using the same. Especially, US2006276992 relates to a radio network, and more particularly, to a segmented antenna system for an offshore radio network used in marine seismic surveying. The publication describes antenna lobe steering by switching physical antennas arranged in a circle in order to obtain full azimuth coverage. The use of a multitude of physical antenna units with fixed antenna lobes gives a static solution. If antenna elements are selected trough relays, some power will be lost in the switching arrangement. The use of relays implies more service and high outage time. Moreover, such an antenna arrangement will not allow elevation steering of the antenna lobe. As elevation can be very important if there are obstructions in the transmission path, this is clearly an inferior solution compared to a dynamic steering system that covers both azimuth and elevation.

US2004229652 discloses coordination of beam forming in wireless communication systems. US2004229652 especially relates to a method and system for coordinating the use of beam forming between two communicating entities in a wireless communication system. This publication is based on measuring the lobe pointing error and reducing it in steps until the pointing error is minimized. It is not disclosed, however, how the error initially is measured. Basically this publication is a simple approach to reducing a known pointing error. The system utilizes both omnidirectional and directive antennas and is therefore a complex solution.

US2011032149 discloses a system and method for antenna optimization for wireless broadband communication. The enhanced antenna array includes a higher-gain antenna and lower-gain antenna. The beam forming antenna, both higher-gain and lower-gain, are designed to be able to transmit to and receive from another transceiver. The higher-gain antenna is designed to form a more directional beam substantially closer to the horizon of an airborne platform; whereas the lower-gain antenna is designed to form a less directional beam at a distance further from the horizon of the airborne platform. Both the higher-gain and lower-gain antenna form their respective beams in the 360 degrees horizontally around the antenna array. The higher-gain antenna is designed for a coverage area from the horizon of the airborne platform to a substantially acute angle from the horizon of the airborne platform in the vertical direction and the lower-gain antenna is designed for a coverage area from the substantially acute angle from the horizon of the airborne platform to substantially vertical. The application of this publication is especially related to delivering data content over unlicensed radio frequency spectrum between airborne platform and surface base stations. Accordingly the system presumes that the airborne platforms communicates with base stations and is not arranged for communicating directly with each other which will be absolutely necessary in SIMOPS operations. The system is neither arranged for taking into consideration that communicating units will move during an operation, as the system is based on communicating with surface base stations which usually will have a fixed position. The system of US2011032149 uses the lower-gain antenna for searching for base stations and the higher-gain antenna for communicating with the base stations. As mentioned above the system of US2011032149 is not arranged for allowing users, i.e. airborne platforms to communicate directly with each other, but the users communicate with base stations which are connected in a network at their side to form a network via which base station network communication between units are possible. By having a higher-gain antenna and a lower-gain antenna results in that it requires two mechanical units and means for splitting the signal. Further, as mentioned above, the system of US2011032149 is not arranged for taking into consideration movement of other units, i.e. this will result in that if the unit the airborne platform is to communicate with is not within the coverage area of the lower-gain antenna, communication will not be possible. The same will also happen if the unit the airborne platform is to communicate with moves out of the coverage area of the lower-gain antenna, the communication will fail. This system is neither arranged for handling reflections, which will be present for maritime SIMOPS operations which will be discussed below.

Another problem that may arise when establishing maritime mobile networks is the local regime regarding allowed frequencies and power levels to be used. In maritime SIMOPS the field of operation may change globally and it is therefore necessary to adapt the use of frequencies and power levels to levels allowed in each geographical area. The national regulations regarding power levels and spectrum use may change substantially between different geographical locations and may have considerable differences between regions and countries. Moreover, in international waters the regulations will be different from national regulations. Based on this, power levels and frequencies may have to be changed from one area to another and even during a maritime SIMOPS operation if the area of operation encompasses more than one country or is partly in international waters.

Current systems rely on manual procedures to change frequencies and power levels when moving between areas with different jurisdiction. This may be a time consuming and cumbersome process that may lead to human errors when changing the required parameters.

Another problem that will arise in areas where there are a multitude of radio transmitters and radar systems is interference to the communication links. In a maritime SIMOPS operation, there will normally be a lot of radio transmitters operating on different frequencies. As most radio transmitters will have some harmonic and spurious radiation, the possibility of interference to a communication system is quite high.

Interference to the communication link can be very harmful and may even close down the communication link totally. Another severe case is when interference modifies data content in the data stream, thereby giving false data which under certain circumstances may lead to failure in the operation. The current procedure to avoid interference is often to manually change frequencies or power levels and thereby re-establishing a useful signal-to-noise-ratio. Depending on the interference source and the distance to the source, manual changes of parameters may or may not be successful.

A major problem regarding radio transmission over sea is reflections from the sea surface and attenuation and refraction of the signal in areas of high humidity. The received signal will be a sum of the direct signal and reflections from the sea surface and possibly other reflecting surface, such as vessel sides. Under adverse conditions these reflections may be of the same magnitude as the main signal and may therefore interfere severely with the main signal. As the phase of the reflected signal depends on the additional path length travelled and the reflection properties of the reflecting surface, the reflected signal may have the opposite phase of the direct signal and thereby cancelling it out.

During wind conditions the surface waves will change the position of the reflecting surface. This will introduce additional noise in the received signal and reduce the channel quality even more.

The current way of reducing the reflection from the sea surface is to use antennas with narrow lobes that suppress the unwanted signal as much as possible. Accordingly there exist no systems or methods which meet the special and demanding requirements set for maritime SIMOPS operations.

The main object of the disclosure is to provide a method and system which solves the above mentioned disadvantages with prior art related to maritime SIMOPS operations.

It is further an object of the disclosure to provide a method and system for providing a maritime high speed broadband communication network for SIMOPS operations.

An object of the disclosure is to provide a reliable, wireless long range, high speed data communication network for use in maritime SIMOPS operations.

Another object is to provide a method and a system which provides increased safety and security of an operation by introducing high speed data transmission from all sensors available.

It is further an object to provide a method and system which is less complex than prior art systems by using narrow phase steerable antennas being controllable in both azimuth and elevation by software control.

Another object of the disclosure is to provide a method and system providing actively monitoring of communication channels in use and arranged for using only free channels to avoid interference to other systems.

It is further an object of the disclosure to provide a method and system which is arranged to handle interference from reflecting signals by software control of the narrow phase steerable antenna, either at the receiving side, at the transmitting side or at both sides.

Another object of the disclosure is to provide a method and system which provides ranging between respective units.

It is further an object of the disclosure to provide a method and a system for actively compensating beam steering algorithms with regard to the movement of the unit carrying the phase steerable antenna.

Another object of the disclosure is to provide a method and a system arranged to use position data, like GPS data, to control operational parameters of the system, including position, heading and velocity of the unit carrying the phase steerable antenna.

It is further an object of the disclosure to provide a method and a system arranged for checking position data with positions obtained by measuring beam angels and time of flight of messages between two units.

Finally it is an object of the disclosure to provide a method and system for locally generating differential correction signals for GPS which can be used by any unit in the network.

SUMMARY

Disclosed is a method for setting up a maritime high speed broadband communication network between several entities. Also disclosed herein is an integrated high speed broadband communication system for use between several entities.

The need for a broadband high capacity data network is based on the fact that maritime SIMOPS operations require large amounts of data transfer, for example, for updating operational databases, electronic maps (ECDIS, ECS), system software, transmission of radar displays, transmission of satellite pictures showing ice conditions, live video, seabed charts, and similar information.

The embodiments disclosed herein provide a new approach to an integrated long range, high capacity communication system for communication directly between several entities or users, such as vessels and units, involved in maritime Simultaneous Operations (SIMOPS).

SIMOPS are described as concurrent maritime activities which have a potential for dangerously interfering with each other. When two or more vessels or units are working together there will always be a probability of undesired events or set of circumstances, reducing safety, making damage to the environment, or damage to assets. SIMOPS operations can typically include, but are not limited to:

a vessel undertaking a non-routine operation within an installations safety zone, work on subsea umbilical, risers and flow lines, field development work with several vessels and contractors.

Vessels include, for example, diving support vessels, heavy lift vessels, supply boats, barges, pipe lay and cable lay, accommodation, seismic and survey vessels, ROV vessels and vessels operating in dynamic positioning mode. Installations cover, for example, fixed and floating production platforms, drilling rigs, DP production units, FPSOs and FPUs.

SIMOPS operations often involve multiple companies (owners, contractors, subcontractors, vendors) large multi-disciplined workforces and a wide range of daily, 24 hour, routine and non-routine construction and commissioning activities.

Accordingly, SIMOPS operations are involving several kinds of vessels, units and fixed installations in cooperation to achieve a common goal by performing one or more operations/tasks. In order to carry out the operations/tasks with high safety and efficiency a common communication network with high capacity is required. Several communication methods already exist, but none of them have sufficient capacity, range and safety for the demanding requirements of maritime SIMOPS operations.

Prior art systems and methods do not have sufficient speed or range for transmitting the data volume necessary for advanced SIMOPS involving several vessels, airborne units and fixed installations in a marine environment. Prior art, like WLAN equipment, have short range, is not optimized for transmission over sea and has reduced capacity when more than one unit is using the network.

The disclosed embodiments provide a major improvement over prior art in lobe steering. Even though phased array antennas are well known in the literature, the disclosed embodiments make it possible to provide antenna lobes with much smaller opening angle than described in prior art. Utilizing innovative technology and advanced signal processing opening angles of +/−4 degrees have been realized.

Moreover, the pointing angle in both azimuth and elevation can be pinpointed down to degrees accuracy by software control only. Controlling the beam both in azimuth and elevation is a prerequisite for obtaining the best performance possible, a fact which so far is not described in prior art publications.

The high speed and long range characteristics of the present embodiments enable high volume data transfer in marine SIMOPS operations. Embedding the disclosed system in a maritime SIMOPS environment will increase data availability and the use of common maps, video transmissions, databases and advanced decision support systems. Moreover the disclosed method and system will contribute to increased flow and sharing of sensor data from all units involved in the maritime SIMOPS operation. Employing the disclosed method and system in maritime SIMOPS operations greatly contributes to increased safety and security for all units involved.

Prior art also fails to provide a communication systems with a high degree of integration and common user interfaces.

A broadband communication network system according to the disclosure will include a communication system including one or more of the following features:

speech communication, data communication, real time Video streaming, storing of data/information, user interface, user control unit, data/information interface unit, integrated message system, means for increased resistance to interference and jamming, means for plain installation and operation, logging facilities—replay of critical events, means for generating input data for simulation and training purposes, interfacing to other communication systems for transmission of vital data to operations rooms and headquarters, etc.

All units must be able to speak to each other either by ordinary telephone systems or by speakerphones. Conference facilities are essential for SIMOPS operations.

For data communication, high speed and high capacity data channels are essential in order to transmit position data, such as DP information, measuring data and process data between the units. Data must be available for the user in an integrated user interface displaying status information, planning data, schedules, drawings, operation support data, search in databases, etc.

Data from video cameras onboard the different units should be available for all units involved in an operation.

It is necessary to provide storing of data/information in order to evaluate work processes and incidents after the operation is completed. All communication data including voice, data, video, operational data, etc., should be stored for later review and evaluation.

The communication system must be configurable from a user interface. The configuration must be easily changeable in order to reflect the current operational needs. Storing functionality must also be easily definable in the configuration of the system.

Position data (heading, velocity, position, etc.), range, capacity and transmission speed are the most important parameters for the communication system. As transmission over sea in no way is trivial due to reflections, ducting and other transmission phenomena, the communication system has to be optimized regarding these effects. Ordinary broadband modems operating at UHF/SHF have either not sufficient capacity or range to meet the maritime SIMOPS requirements of typically 10 Mbit/sec at 5 km range.

Radio transmission over sea will provide reflections from the sea surface and attenuation and refraction of the signal in areas of high humidity. The received signal will be a sum of the direct signal and reflections from the sea surface which under adverse conditions may be of the same magnitude as the main signal and may therefore interfere severely with the main signal. As the phase of the reflected signal depends on the additional path length travelled and the reflection properties of the reflecting surface, the reflected signal may have the opposite phase of the direct signal and thereby cancelling it out or at least weaken the signal so that poor transmission quality is the result. Wind conditions will result in that the surface waves will change the position of the reflecting surface which will introduce additional noise in the received signal and reduce the channel quality even more. The current way of reducing the reflection from the sea surface is to use antennas with narrow lobes that suppress the unwanted signal as much as possible. Accordingly, prior art will help reducing the interference problem, but only to some degree.

The communication system of the disclosure overcomes the restrictions of ordinary broadband (WLAN) equipment by utilizing narrow lobe phase steerable antennas giving very narrow and steerable antenna lobes together with unique modulation and data transmission control methods to optimize transmission speed and range.

By that the fact that the present system and method utilize steerable lobes with very narrow beam width provides more effective ways to reduce the above mentioned interference due to reflections. By pointing one antenna lobe at a transmitting antenna and one lobe towards a reflection point it is possible to introduce an additional phase shift on the reflected signal in such a way that it will always add the reflected signal to the direct signal. The reflected signal can thus be changed into a constructive signal that will always improve the communication channel.

Another approach which can be used for this is by generating one or more nulls in the antenna diagram in direction of the reflection point, either in the transmitting antenna or/and the receiving antenna. As the reflection point depends on the distance between the transmitting unit and the receiving unit and the antenna height at both sides, the direction and position of the reflection point can be calculated with high accuracy when the position of the transmitting and receiving unit is known. The position of the reflection point is then used as an input parameter in software for forming antenna lobes having one or more nulls in the direction of the reflection point. This can be done at each side of the communication path, thereby reducing the transmitted and received power in the reflection path to a great extent. Adaptively forming the transmitting antenna beam to avoid transmission towards the reflection point is not known from prior art. This approach is called Adaptive Reflection Cancellation (ARC) and is described in further detail in the following.

Another approach to reduce the effects of sea reflections is to monitor the characteristics of the reflection point by establishing a dedicated monitoring channel using the reflection path. This approach can be implemented by monitoring the received signal only, or by using a dedicated pilot signal with known parameters and modulation transmitted from the transmitting unit.

In a first implementation the receiving unit points a narrow lobe directly at the reflection point. The received signal is then analysed and the characteristic parameters for the reflection point, like amplitude and phase delay, are measured and stored in a database. These parameters will change over time according to the movement of the sea surface due to wind, waves and other sea state parameters. Measuring the amplitude and phase variation over time makes it possible to generate a model of the behaviour of the reflecting surface and the reflected signal that can be used for estimating correction signals that can be used for correction of the main signal. As one mainly will be interested in short term changes in the reflection parameters, and the change in sea state will have a relatively long period compared with the period of the modulating signals, it is possible to achieve a good estimation of the correction signal using this method.

In a second implementation of this principle a dedicated carrier modulated with a known code word sequence is directed directly towards the reflection point. At the receiving end the signal will be influenced by sea reflections and the code word will be garbled. As the code word sequence is know it is possible to generate a correction signal using correlators that correlate the received and the known signal. The estimated correction signal is then applied also to the main signal thereby correcting the main signal accordingly.

Yet another implementation of using a software controlled phase steerable antenna lobes is to adjust the lobe elevation to an optimum interference free angle for reception.

Having software control of the lobe also allows for splitting the lobe in two main parts, one lobe aligned with the direct free space path and one pointing directly to the reflection point. Using advanced signal processing, the direct signal can then be delayed so it is in phase with the reflected signal thereby creating a constructive interference between the direct and the reflected signal in order to cancel the negative influence of the reflected signal.

It should be mentioned that reflections are not only due to sea surface reflections, but can also come from other surfaces, like vessel surfaces, or other sources creating reflected signals.

Another major advantage of the disclosed system and method is that the antenna system is fixed and contains no movable parts. This makes antenna mounting extremely easy and reduce antenna maintenance to a minimum.

The communication system according to the disclosure is arranged for one or more of the following basic operations:

all digital data sources on a unit are interfaced to the communication system through an interface unit, where interface standards will typically be data interfaces like RS 232, RS 422, USB and similar, the interface unit is connected to a user control unit arranged to take care of data channel switching, multiplexing, the user interface and interface to the radio system, the user control unit controls data transmission to the radio system and supplies input data for operation of the radio, i.e. power levels, antenna lobe steering control, addressing or users etc.

All users involved in the maritime SIMOPS operation preferably have the same kind of equipment in order to be part of the communication network, hereinafter described as a user unit. One user unit may be defined as a master user unit. A master user unit will be arranged to configure the other user units to operate in the network according to a chosen configuration. Accordingly the master unit will not work as a base station which the user units must transmit via, but will act as a master setting the communication properties for the network. Moreover, the role of the master can be re-allocated to another unit if the conditions make this favourable.

The communication network will work as an integrated and intelligent network setting up the chosen communication paths and supplying data from relevant sources to chosen users and for communication directly between respective users.

The user control unit is arranged to present data on an integrated user interface which preferably is identical for all users.

The user control unit is further arranged to distribute status data, pictures from operations or video streaming and present the information in the same user interface. Typical video presentations will be data from sensors, DP data, video stream and position data for all units involved in the operation.

The user control unit may also be arranged to receive other relevant data input, such as sea state data like wave heights and drift parameters, or updated met data and met forecasts. DGPS (Differential Global Positioning System) data, such as position, heading, velocity, etc., or local correction data for improved positioning accuracy may also be included.

The user control unit is further preferably provided with storage means, e.g. in the form of databases, for storing all relevant information to be used in the SIMOPS operation. Typical information will be working plans, updated schedules, met-information, work orders, navigational data, electronic maps, radar information, subsea infrastructure, alarms etc. All information relevant to the specific SIMOPS operations should be available in the databases and thereby providing personnel at all levels with an efficient and powerful tool to run the operation in the safest and most efficient way possible.

In order to enhance time used for taking decisions in case of problems an intelligent decision support system providing advice on solutions may also be incorporated in the user control unit.

SIMOPS operations will be performed with a number of users up to more than 5 km distance from each other. In order to achieve high speed data capacity over sea it will be necessary to use very narrow antenna lobes in order to have maximum antenna gain, i.e. high gain in both azimuth and elevation. The communication system is accordingly provided with narrow lobe phase steerable antennas and will in an initial setup scan the horizon for all other users. User identification and position data, such as position, heading, velocity, etc., will be stored for future use so that the antenna lobes on each user may rapidly be steered to the correct position.

As the users move, an update scan for the new position data will be performed. The user units will for this include a database for storing information regarding all other units and their position data, i.e. position, heading, velocity, etc. By that one knows the current position, heading and velocity one will be able to predict where the user will be after a period of time, and accordingly point the antenna lobe in a predicted a direction.

If the transmission conditions deteriorates due to long range, reflection problems or high moisture content in the transmission path, the communication system will automatically detect the deterioration and compensate by increasing transmit power or reduce transmission speed.

The communication system is arranged to adapt to different transmission conditions and at any time optimize for speed and range. As described above the communication system is also arranged for handling reflections due to sea surfaces or other surfaces which will provide reflected signals.

The communication system further includes an integrated messaging system which is arranged for transmission of written messages or mail between all users involved.

Another implementation of the communication system is by using meshed network system architecture. The meshed network is a highly autonomous network which may adopt itself to different operation conditions based on a set of parameters instructing the network how to behave under different circumstances. Each node (user) in the network has a unique identity and forwarding mechanism. Transmission of data is based on relaying data between nodes (users) that can reach each other. Nodes (users) that normally cannot communicate directly point to point due to long distance or inferior transmission quality can now communicate by transmitting the data from one node (user) to another, thereby forming a transmission path which may count several nodes (users). Limitations due to long transmission paths may thereby be easily overcome. The meshed network can be designed with a master user responsible for programming all parameters in the system, or the network can be designed to be totally autonomous.

A method according to the disclosure for setting up a maritime high speed broadband communication network may be summarized in the following steps:

each user performs, via a phase steerable antenna generating one narrow lobe, a scan of the horizon for other users or issue an interrogation message and ask if other users are operative and what their position, heading and velocity and user identification are, forming a network via which the users can communicate directly with each other by that each user sets up a database including operative users and their position, heading and velocity, measuring signal strength, signal to noise ratio, data throughput and other transmission parameters, such as Bit Error Rate and re-transmission rate, and calculating optimized transmission parameters, directly from one user to another user, optimizing the direction of the narrow lobe of the phase steerable antenna in both azimuth and elevation for best possible data throughput for each user directly to the respective other users, controlling/steering the phase steerable antennas for users communicating directly with each other based on optimized transmission parameters from step c) and antenna lobe directions from step d) to achieve high gain in both azimuth and elevation for the generated narrow lobes, at predefined periods repeat steps a)-e).

Step a) includes that the user units are searching both in azimuth and elevation via one narrow lobe to cover all possible transmission paths, for example, searching 360 deg. in azimuth and 90 deg. in elevation.

Step e) includes increasing transmit power or reduce transmission speed to achieve optimized transmission parameters for direct communication between respective users (11).

Step e) includes steering the narrow lobe of the phase steerable antenna to a direction having highest energy content between the respective users (11).

Step e) includes forming the narrow lobe by individually controlling the phase of each single antenna element in the narrow lobe phase steerable antenna. As the element phasing can be controlled in software, there is an option to form one or more deep nulls, as well as narrow lobes. Deep nulls can be used for interference suppression in a desired direction, thereby considerably suppressing interference sources and maximizing signal-to-noise-ratio. As the software control enables beam forming of individual shapes, this method makes it possible to tailor the antenna directional diagram to the most suitable form for the actual application. As an example the antenna system may generate two main lobes in different directions in order to simultaneously directly communicate with two different units.

Accordingly is by optimized transmission parameters meant optimized speed, range, direction, highest energy content, transmit power and beam forming for achieving as high throughput of data as possible. The software control also opens for handling interference due to reflections, attenuation and refraction of the signal due to sea surface or other surfaces, and due to weather conditions, as described above.

The method further includes exchanging data and information directly between the respective users via software controlled architecture: point to point, point to multipoint or meshed network. The method may also include combining the different architectures, so that if point to point is not possible, a meshed network can be arranged for reaching units not being directly available by point to point.

The method preferably further includes identity check or encoding/decoding of signals. For example, in meshed network one will need identification of the units and feedback about status for each of the units to the previous unit.

The method preferably also includes steps for limited information/data flow. Messages may be prioritized so that separate messages may be marked with priority flag, for example HIGH PRIORITY, medium priority or low priority, and thus can be processed before other messages. The system opens for this in that messages may be stored and prioritized before they are forwarded in the network. Typical will messages regarding danger, injuries of personnel and damage of equipment or similar be prioritized in front of other messages.

The method further includes that if the throughput of data is low, the messages are prioritized according to the above described priority flag to make sure that important messages are prioritized. Position data is especially important when the distance between several users are small, so it is then important that messages involving measured distances, for example from GPS, radar or other systems, are prioritized.

In some cases it will be of vital importance that prioritized messages reach their destination even if the radio network is heavily loaded or some of the units are down due to interference, reflections, distance limitations or technical faults. In order to achieve a high probability of secure communication it is possible to use a mesh network and transmit the messages through several routes at the same time, i.e. redundancy. A message that must be transmitted with high probability of reception is then transmitted to several other units at the same time. Each receiving unit is then responsible for forwarding the message along different routes to the final destination. Upon reception an acknowledgment message will be sent to the originating unit. In order to avoid message collision from messages from the different routes, controlled delay in each unit must be applied so the receiving unit receives all messages from the different routes in a controlled manner.

The method preferably further includes actively monitoring communication channels in use and use only free channels to avoid interference to other systems. This approach is called cognitive communication and is made possible by introducing sophisticated monitoring and decision algorithms in the system according to the disclosure. The system will thus continuously monitor available free channels and only use free channels at any given time.

The method preferably further includes actively compensating beam steering algorithms with regard to the movement of the unit. As the antenna system normally is fixed to the unit structure, the antenna beam will be influenced by the unit's movement in at least three axes, i.e. roll, pitch and heave. By using a movement sensor, like the applicants MRU—Motion Reference Unit, it will be possible to compensate for this movement of the beam directly via the system software. Data about the roll, pitch and heave movement will be transmitted from the movement sensor to the antenna beam controlling software in order to maintain a correct antenna lobe position in both azimuth and elevation.

The method preferably further includes using position data, like GPS data, to control the operational parameters of the system. In SIMOPS operations it is essential to know the position of other units at all time. A unit can be communicating with one unit at one stage of the operation for the next moment to communicate with another, for again to return communicating with the first unit. It is accordingly important to know position, heading and velocity for a unit to be able direct the narrow lobe in the correct direction of the unit it is to communicate with. When one knows the position, heading and velocity in one point, one can predict where the user is positioned in the next moment. If one not takes into consideration that the units move one will lose the communication link which will not be acceptable in a SIMOPS operation.

Frequencies and power levels may be dependent on the geographical position (different jurisdiction). Manual procedures to change the frequency and power levels is time consuming and cumbersome and may lead to human errors when changing the required parameters. In order to solve this problem, information about geographical areas and limitations regarding spectrum and power levels may be stored in a database which can be used for selecting the appropriate parameters for the actual geographical area by the use of position data. In this way the system according is arranged to use position data as input in order to set the dependent parameters according to the current geographical position. The units may therefore move between different geographical positions and automatically switch to the allowed frequencies and power levels and other geographical parameters allowed for the actual geographical area.

The method preferably further includes measuring beam angels and time of flight of messages directly between two users or measuring path delay and compute the direct distance between the respective users. The first user issues a special position request and asks for the second user's position. The answer is transmitted to the first user with a controlled delay in the second user. When the message is received at the first user, the distance and bearing of the second user is automatically computed and compared with position data obtained from GPS/GNSS. The first user now has two different estimates for the position of the second user and can decide the correct position with higher integrity than by only having one position report.

The method preferably further includes locally generating differential correction signals for position identification, like GPS, which can be used by any user in the network. This will provide higher accuracy for the position reports than can be obtained with, for example GPS alone, or by any available differential service in the area. This can be used as a second source for differential corrections. If the GPS differential correction signal falls out, one can check if the last differential correction for the GPS is correct.

A basic requirement in SIMOPS operations is accuracy in distance measurements. A SIMOPS operation can involve several units and fixed structures operating close to each other. To avoid collision, the distance between objects must be known with extremely high accuracy in real time. Such distance information is used as input to navigation systems and navigational decisions will be taken on the basis of such information. The normal requirement in SIMOPS is that the distance steel-to-steel has to be known with an accuracy of better than 1 meter in real time.

The requirement of 1 meter accuracy can only be met with high accuracy GPS and DGPS methods. This accuracy also requires 3D databases of the physical layout of units and objects in order to compute the closest distance between a unit and other objects. 3D models involve large databases that have to be updated on a regular basis. It is therefore important to have an efficient broadband data communication system that can be used for updating the databases on all units involved in the operation.

As GPS and DGPS systems may fail when units, such as vessels and structures, are close to each other due to shadowing effects, it is a need for an additional ranging system that can compute the distance between units/objects with high accuracy. As the present system and method include a system utilizing narrow and controllable lobes, such ranging can be accomplished by the use of the communication system as a ranging device. In this application, an addressed message with high priority is issued from one unit to a named other unit. When the message is received and decoded as a ranging message, the named receiving unit responds immediately with a confirmation message to the originating unit. Based on the time delay from transmission to reception, the distance between the units can be computed with high accuracy. This gives an additional measurement of the distance between the objects/units and can be used for backup or quality check of the measured GPS/DGPS distance. If a radar system is also present, this gives three different independent methods for ranging that can be used simultaneously. For complex operations requiring extraordinary safety measures, three independent ranging systems may be required.

The reason for using addressed messages in the above described application is that several units may receive the ranging message simultaneously. In order to avoid timeslot collisions and conflicts between several responding units, only the addressed unit is allowed to answer.

For critical situations, where distance measurement is crucial for the operation, a stream of ranging messages can be transmitted and thereby provide a continuous updating of the distance data.

In another embodiment of the same ranging principle, the ranging message will not use addressing to a specific unit. Instead responses from several units are allowed. In order to avoid time slot collisions each responding unit introduces a controlled time delay before answering. The time delay is related to the identity of the answering unit in a unique way and is subtracted from the ranging measurement of the receiving unit in order to compute the correct time delay and thereby the distance to each and every responding unit.

For even greater accuracy, phase measurements of the received signal can be used to increase the accuracy.

This ranging provides the system with redundancy for distance measurements.

As mentioned above, interference can cause a lot of problems in systems like these. The interference, however, will often be restricted to a number of frequencies and a number of geographical directions or positions. In order to overcome such interference problems the system and method includes establishing an adaptive communication system that stores information about noisy frequencies and directions to the interference source in a database and use an adaptive optimization algorithm to avoid the interference from such sources. Moreover, when data about interference is stored in a database, the interference characteristics like frequency, amplitude, timing, duration and history can be used for analysing the interference source, thereby providing a valuable tool which can be used for interference detection, positioning and removal. This can also be used for controlling the phase steerable antenna to form one or more nulls in the direction of the interference source or via a signal adapted to counteract the interference signal, and by that block the signal from the interference source.

Interference from electric equipment or faulty transmitters onboard other units can be detrimental to the availability and capacity of the radio system. As each unit is equipped with a steerable lobe it is possible to search for the direction of the interfering source from each unit. Having two or more units aiming at the same interfering target makes it possible to compute the position and the distance to the target. As the units may be at some distance from each other they effectively constitute a long baseline radio direction finding system thereby making it possible to identify the position of interference sources with great accuracy. This can be used for used for detection of an interference source, finding the position of the interference source and either removal of interference source or repair of the interference source. This can also be used for controlling the phase steerable antenna to form one or more nulls in the direction of the interference source and by that block the signal from the interference source.

The method further includes updating the user interface with received data at predefined periods.

The system and method thus provides the following innovations over prior art:

high speed High capacity data transmission over long sea paths,
software controlled lobe forming,
software controlled adaptive lobe steering,
high level of sensor integration,
software controlled architecture: point to point, point to multipoint, meshed network,
position dependent parameters,
fixed antenna—no movable parts,
cognitive channel selection and administration,
position control by comparing GPS positions with beam directions and time of flight measurements or measured path delay, and
automatic priority handling.

Further preferable features and advantageous details of the method and system will appear from the following detailed description.

BRIEF DESCRIPTION OF THE DRAWINGS

The invention will below be described in more detail with reference to the attached drawings, where.

DETAILED DESCRIPTION

Figure 1:
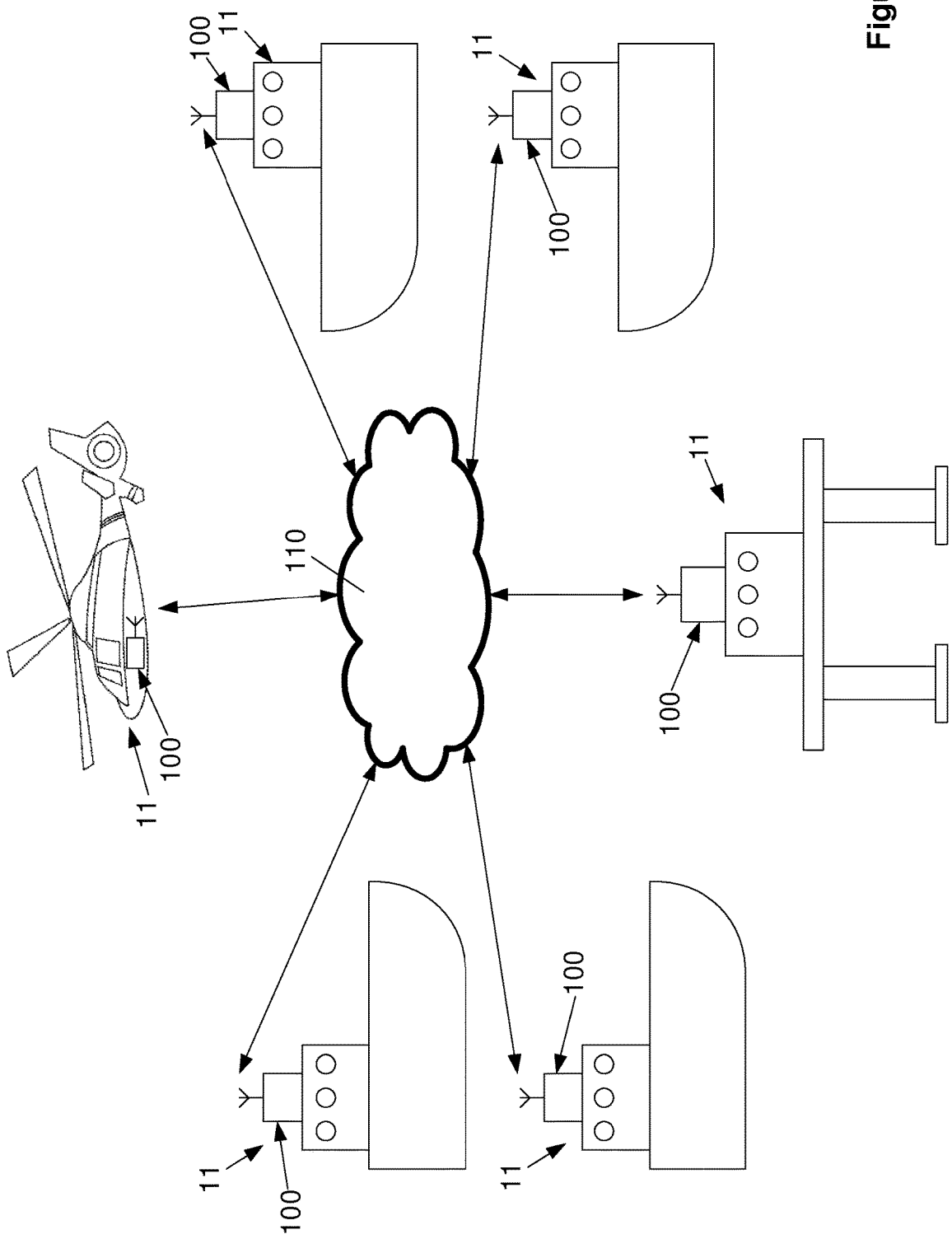
FIG. 1 shows an illustrative drawing of the use of the invention.

Reference is now made to FIG. 1 which is an illustrative drawing of the use of the disclosure. The Figure illustrates a typical situation of a maritime SIMOPS operation, where several users 11 in the form of vessels, aircrafts, helicopters, platforms or similar are cooperating in an operation. In the example there are shown four vessels cooperating with a platform and a helicopter.

The disclosure is especially related to a communication system which provides maritime high speed broadband communication networking between the users. The communication system further provides a reliable, wireless long range, high speed data communication network for use in maritime SIMOPS operations. The communication system also provides increased safety and security of the maritime SIMOPS operation by introducing high speed data transmission from all sensors available.

The communication system includes for this user units 100 which are arranged to each user 11. The user units 100 are preferably the same for all the users 11, which user units 100 are arranged for forming a network 110 via which they can communicate directly with each other.

Figure 2:
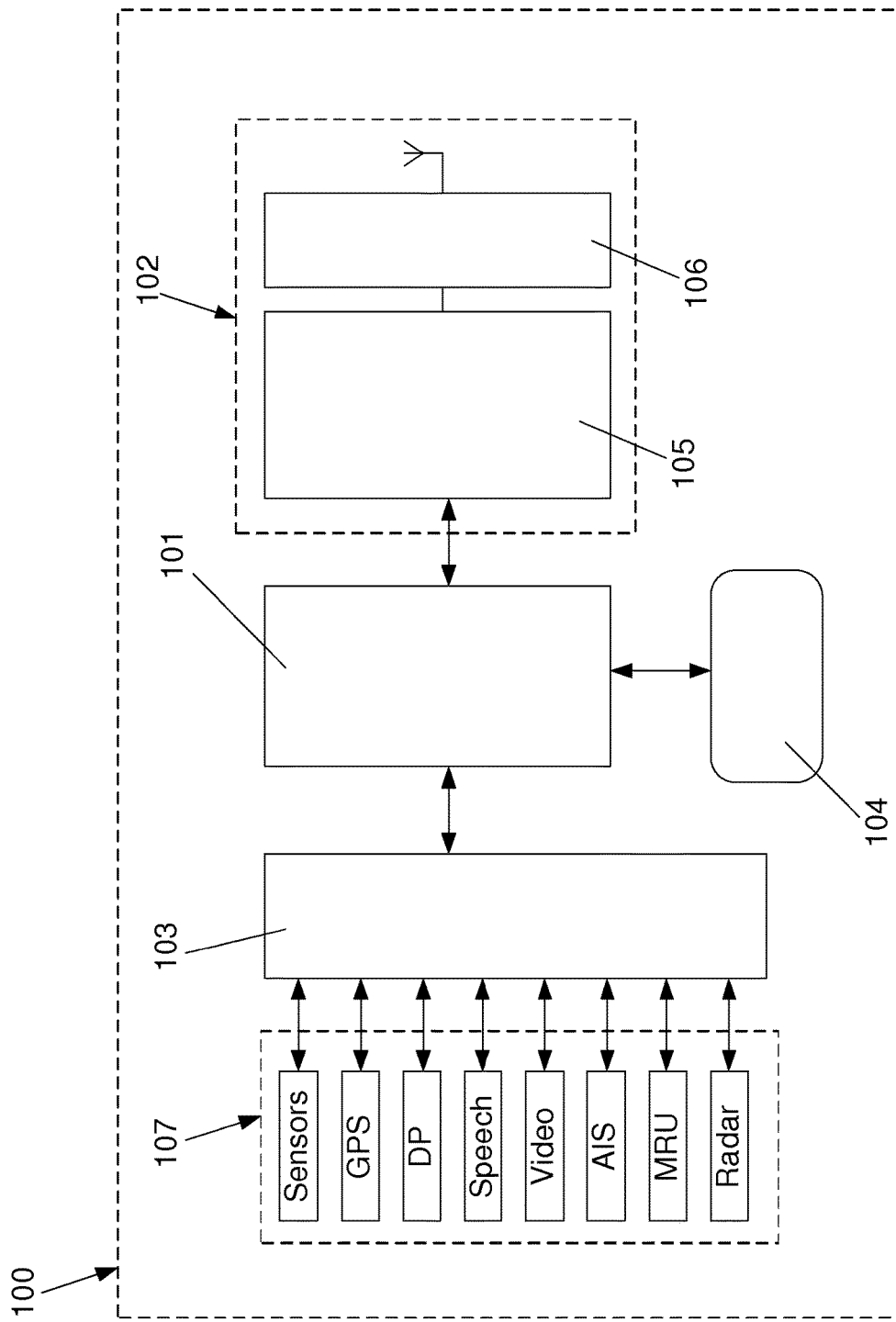
FIG. 2 shows details of a user unit according to the invention.

Reference is now made to FIG. 2 which shows details of a user unit 100 according to the disclosure. The user unit 100 includes a user control unit 101 having external and/or internal memory for storing of data/information, such as a database, communication unit 102, an interface unit 103 and a user interface 104. The interface unit 103, communication unit 102 and user interface 104 are connected to the user control unit 101.

The communication unit 102 preferably includes a radio system 105 and a narrow lobe phase steerable antenna 106. The use of narrow lobe phase steerable antennas 106 provide narrow and steerable antenna lobes which together with unique modulation and data transmission control methods can be used to optimize transmission speed and range.

A method for optimizing beam direction of the narrow lobe phase steerable antenna 106 will now be described. The user unit 100 enters a search mode, wherein the user unit 100 transmits a predefined low speed identity signal with position parameters (position, heading, velocity, etc.) and is asking for a response from other user units 100. When another user unit 100 detects the identity signal they respond by transmitting their own identity and position data, i.e. position, heading, velocity, etc. Each user units 100 then builds a database of active user units 100 and their position, heading, velocity, etc. for future use. The user unit 100 searching will preferably search 360 deg. in azimuth and 90 deg. in elevation, thereby covering all possible transmission paths available. Having information about active user units 100 and their position, heading, velocity, etc., the user units 100 can now choose the optimum beam pointing angle and start transmitting high speed data. The search mode is preferably activated on a regular basis, say once every minute in order to have updated user units 100 and position data, i.e. position, heading, velocity, etc. By means of the stored position, heading and velocity a user is able to predict where another user will be in the future and direct the antenna lobe in that direction when the user is to communicate with the respective user.

As the main transmission energy is contained within a few Fresnel zones around the line of sight, it is important that most of the Fresnel zones are clear in order to obtain a high signal-to-noise ratio. If some part of the Fresnel zone is blocked due to object, such as vessels or buildings, or landscape in the transmission path, it becomes very important to steer the beam in the direction which has the highest energy content. This will probably be in a direction towards the transmitter and at some elevation. Steering the beam to the optimum elevation therefore becomes very important. The user control unit 101 is provided with means and/or software for performing this.

Also beam forming must be considered in an application like this, i.e. maritime environment. The art of beam forming is based on individually controlling the phase of each single antenna element in the narrow lobe phase steerable antenna 106. As the element phasing can be controlled in software arranged in the user control unit 101, there is an option to form one or more deep nulls, as well as narrow beams. Deep nulls can be used for interference suppression in a desired direction, thereby considerably suppressing interference sources. As the software control enables beam forming of individual shapes, this method makes it possible to tailor the antenna directional diagram to the most suitable form for the actual application.

In addition software control makes it possible to control the antenna to handle reflections from the sea surface and attenuation and refraction of the signal in areas of high humidity, and also reflections from other surfaces.

The interface unit 103 is further arranged for acquiring information from relevant sources 107, such as information or data from sensors, GPS, DP, MRU, radar, speech, video or Automatic Identification Systems (AIS). The interface unit 103 may also receive other relevant data input, such as sea state data like wave height and drift parameters or updated met data and met forecasts. DGPS data or local correction data for improved positioning accuracy may also be included.

As the narrow lobe phase steerable antenna 106 will be mounted on the user structure, the lobe direction will be heavily dependent on the user's movement, like roll, pitch and heave. In order to compensate for this movement a motion sensor, typically the applicant's product MRU (Motion Reference Unit), may be used to dynamically compensate for the pointing error introduced by the user's movement. By that the motion sensor (MRU) is interacted with the user unit 100 it is possible for the user control unit 101 to correct the pointing direction in both azimuth and elevation by sending correction messages to the lobe steering software in order to minimize any pointing errors.

Data transmission quality may change over time due to reflections from moving vessels or changing parameters like humidity, reflections from the sea, ducting etc. The optimal pointing direction for the narrow lobe phase steerable antenna 106 may therefore change under such conditions. The parameters controlling the pointing direction should therefore be updated continuously to ensure optimum data throughput at all times.

The quality of the data transmission may be defined by several parameters like signal strength, signal-to-noise ratio, data throughput and parameters for Quality of Service (QOS). To ensure optimum data throughput under all conditions, these parameters are monitored in software in the user control unit 101 in order to optimize the throughput.

One of the user units 100 may be defined as master user unit. The master user unit is arranged to instruct the other user users 100 to operate in the network 110 according to a chosen configuration. Accordingly the users will not communicate via the master user, but the master user will set parameters for the communication network.

The user control unit 101 of the master user unit 100 or other user units 100 are arranged for monitoring the transmission conditions as described above, and if the transmission conditions deteriorates due to long range, reflection problems or high moisture content in the transmission path, the user control unit 101 is arranged to automatically detect the deterioration and compensate by increasing transmit power, increase re-transmission or reduce transmission speed.

Figure 3A:
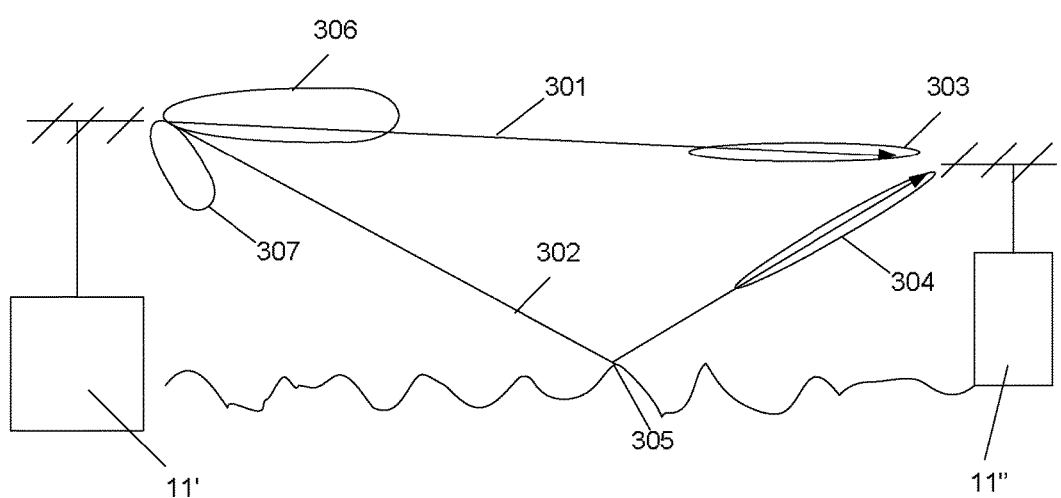
FIGS. 3a-b shows an illustration of reflection cancellation in the present invention.
Figure 3B:
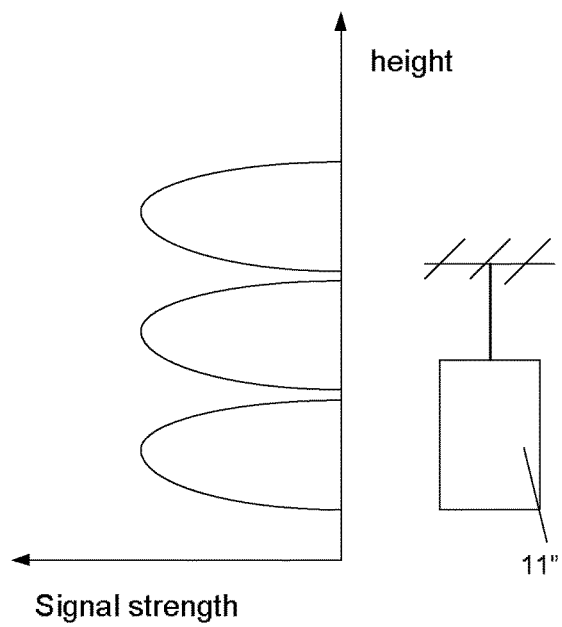

Reference is now made to FIGS. 3a-b which shows an illustration of reflection cancellation function via dual software-controlled antenna lobes. In FIG. 3a is shown a transmitting user 11' and a receiving user 11". As one can see there is a direct signal 301 and a reflected signal 302. The received signal will be a sum of the direct signal 301 and the reflected signal 302 from the sea surface which under adverse conditions may be of the same magnitude as the direct signal 301 and may therefore interfere severely with the direct signal 301. As the phase of the reflected signal 302 depends on the additional path length travelled and the reflection properties of the reflecting surface, the reflected signal 302 may have the opposite phase of the direct signal 301 and thereby cancelling it out or at least weaken the direct signal 301 so that poor transmission quality is the result. The surface waves will in addition change the position of the reflecting surface due to wind and currents, which will introduce additional noise in the received signal and reduce the channel quality even more.

This effect may be reduced by that the receiving user 11" is pointing one antenna lobe 303 at the transmitting user 11' and one antenna lobe 304 towards the reflection point 305. In this way it is possible to introduce an additional phase shift on the reflected signal in such a way that it will always add the reflected signal 302 to the direct signal 301. The reflected signal 302 is now changed into a constructive signal that will always improve the communication channel.

An alternative to this is by generating a null in the antenna diagram in direction of the reflection point 305. Due to the fact that the reflection point 305 will be dependent of the distance between the transmitting user 11' and the receiving user 11", and the antenna height at both sides, as shown in FIG. 3b where signal strength is shown as a function of height at the receiver user 11', the direction and position of the reflection point 305 can be calculated with high accuracy. The position of the reflection point 305 is then used as an input parameter for forming the antenna lobe to have one or more nulls in the direction of the reflection point 305. This can be done at each side of the communication path, thereby reducing the transmitted and received power in the reflection path. By controlling the antenna of the transmitting user 11' to form one or more nulls in the direction of the reflection point 305, by splitting the antenna lobes into two lobes as for the receiving user 11', i.e. one lobe 306 directly against the receiving user 11" and one lobe 307 in direction of the reflection point 305, one will already at the starting point be reducing the effect towards the reflection point 305 so that the reflected signal is significantly reduced.

An alternative way to reduce the effects of sea reflections is to monitor the characteristics of the reflection point 305 by establishing a dedicated monitoring channel using the reflection path 305. This can be done by monitoring the received signal only, or by using a dedicated signal with known parameters transmitted from the transmitting user 11'.

In a first implementation the receiving user 11" directs a narrow lobe 304 directly at the reflection point 305. The received signal is then analysed and the characteristic parameters for the reflection point 305, like amplitude and phase delay, are measured and stored in a database. As these parameters will change over time according to the movement of the sea surface due to wind, waves and other sea state parameters, the measurement of amplitude and phase variation over time makes it possible to generate a model of the behaviour of the reflecting surface and the reflected signal that can be used for estimating correction signals. These correction signals can then be used for correction of the direct signal 301.

In a second implementation of this principle a dedicated carrier modulated with a known code word sequence is directed directly towards the reflection point 305. At the receiving user 11" the signal will be influenced by sea reflections and the code word will be garbled. As the code word sequence is know it is possible to generate a correction signal using correlators that correlate the received and the known signal. The estimated correction signal is then applied to the direct signal 301 thereby correcting the main signal accordingly.

Yet another implementation of using a software controlled steerable antenna lobes is to adjust the lobe elevation to an optimum interference free angle for reception, at the receiving user 11" and/or the transmitting user 11'.

Having software control of the lobe also allows for splitting the lobe in two main parts, one lobe 303, 306 aligned with the direct free space path towards the transmitting user 11' and one pointing directly to the reflection point 305, 307. Using advanced signal processing, the direct signal 301 can then be delayed so it is in phase with the reflected signal thereby creating a constructive interference between the direct 301 and the reflected signal 302 in order to cancel the negative influence of the reflected signal 302.

The user control unit 101 is further arranged for controlling the narrow lobe phase steerable antennas 106 and will as described above perform an initial scan of the horizon for all user units 100. As one or more user units 100 are detected, user identification and position, heading, velocity, etc., will be stored for future use so that the antenna lobes on each user 11 may be rapidly steered to the correct position. The user control unit 101 is further preferably arranged to perform update scans at predefined intervals or for new position data, i.e. position, heading, velocity, etc., of a user 11. The stored position, heading and velocity can also be used to predict the direction to another user so that scans does not need to be performed as frequently. In this way the user control unit 101 will adapt to different transmission conditions and at any time optimize for speed and range.

The user control unit 101 is in addition arranged for controlling data transmission to the radio system 105 and arranged for supplying input data for the operation of the narrow lobe phase steerable antenna 106, i.e. power levels, antenna lobe steering control, addressing, users, etc.

The user control unit 101 is further arranged to present data/information on the integrated user interface 104, so that all the user units 100 preferably present identical data/information. Presented information may be data, pictures from operations or video streaming. Typical video presentations will be data from sensors, DP data, MRU, radar, video stream and position data for all units involved in the operation. Other information/data which should be available for the user on the user interface 104 are status information, working plans, updated schedules, met-information, work orders, navigational data, electronic maps, radar information, subsea infrastructure, alarms etc. All information relevant to the specific SIMOPS operation should be available in the databases and be displayed on the user interface 104. In this way personnel at all levels will be provided with an efficient and powerful tool to run the operation in the safest and most efficient way possible.

The user control unit 101 is further arranged for taking care of data channel switching, multiplexing, controlling the user interface 104 and providing an interface to communication unit 102.

The user control unit 101 is further arranged for exchanging data and information between the respective users 11 via software controlled architecture: point to point, point to multipoint or meshed network. The user control unit 101 may also be arranged to combine the different architectures, so that if point to point is not possible, a meshed network can be arranged for reaching units 11 not being directly available by point to point.

The user control unit 101 is further provided with means and/or software for performing identity check or encoding/decoding of signals. For example, in meshed network one will need identification of the units 11 and feedback about status for each of the units 11 to the previous unit.

The user control unit 101 is further arranged for limiting the information/data flow by being able to prioritize separate messages be marking them with a priority flag, for example HIGH PRIORITY, medium priority or low priority. This is possible in that messages may be stored and prioritized before they forwarded in the network. In this way important messages can be processed before other less important messages.

The user control unit 101 is further arranged for prioritizing messages if the throughput of data is low. Prioritized messages, such as position data involving measured distances, can then be prioritized to maintain security.

The user control unit 101 is further arranged for actively monitoring communication channels in use and use only free channels to avoid interference to other systems. This is achieved by that the user control unit 101 is provided with sophisticated monitoring and decision algorithms. The user control unit 101 will thus continuously monitor available free channels and only use free channels at any given time.

The user control unit 101 is further arranged for actively compensating beam steering algorithms with regard to the unit's movement. As the narrow lobe steerable antenna 106 normally is fixed to the vessel structure, the antenna beam will be influenced by the unit's movement in at least three axes, i.e. roll, pitch and heave. By using information from a movement sensor, like the applicant's MRU—Motion Reference Unit, it will be possible to compensate for this movement of the beam directly via the software in the user control unit 101. For example, data about the roll, pitch and heave movement from the movement sensor can be used to maintain a correct antenna lobe position in both azimuth and elevation.

The user control unit 101 is further provided with means and/or software for using position data, like GPS data, to control the operational parameters of the system. In different geographical areas there are limitations/requirements regarding frequencies, spectrum and power levels which may be used, for example, to not interfere with frequencies and power levels used by onshore radar systems. The system will always know which frequencies and power levels which are allowed in the actual geographical area by that position data are used to check which limitations/requirements are allowed by checking data in a database. The information about this may be downloaded from a database or be prearranged in a database of the system. In this way the disclosed system automatically adapts to the actual limitations/requirements when entering a new area by that the parameters, such as frequency and power levels, of the system are automatically changed by the system, i.e. automatic control of the phase steerable antenna.

A basic requirement in SIMOPS operations is accuracy in distance measurements. For this the user control unit 101 is further preferably provided with 3D databases of the physical layout of units and objects in order to compute the closest distance between a unit and other objects.

As GPS and DGPS systems may fail when units, such as vessels and structures, are close to each other due to shadowing effects, the system is provided with an additional ranging system for computing the distance between units/objects with a high accuracy.

Figure 4A:
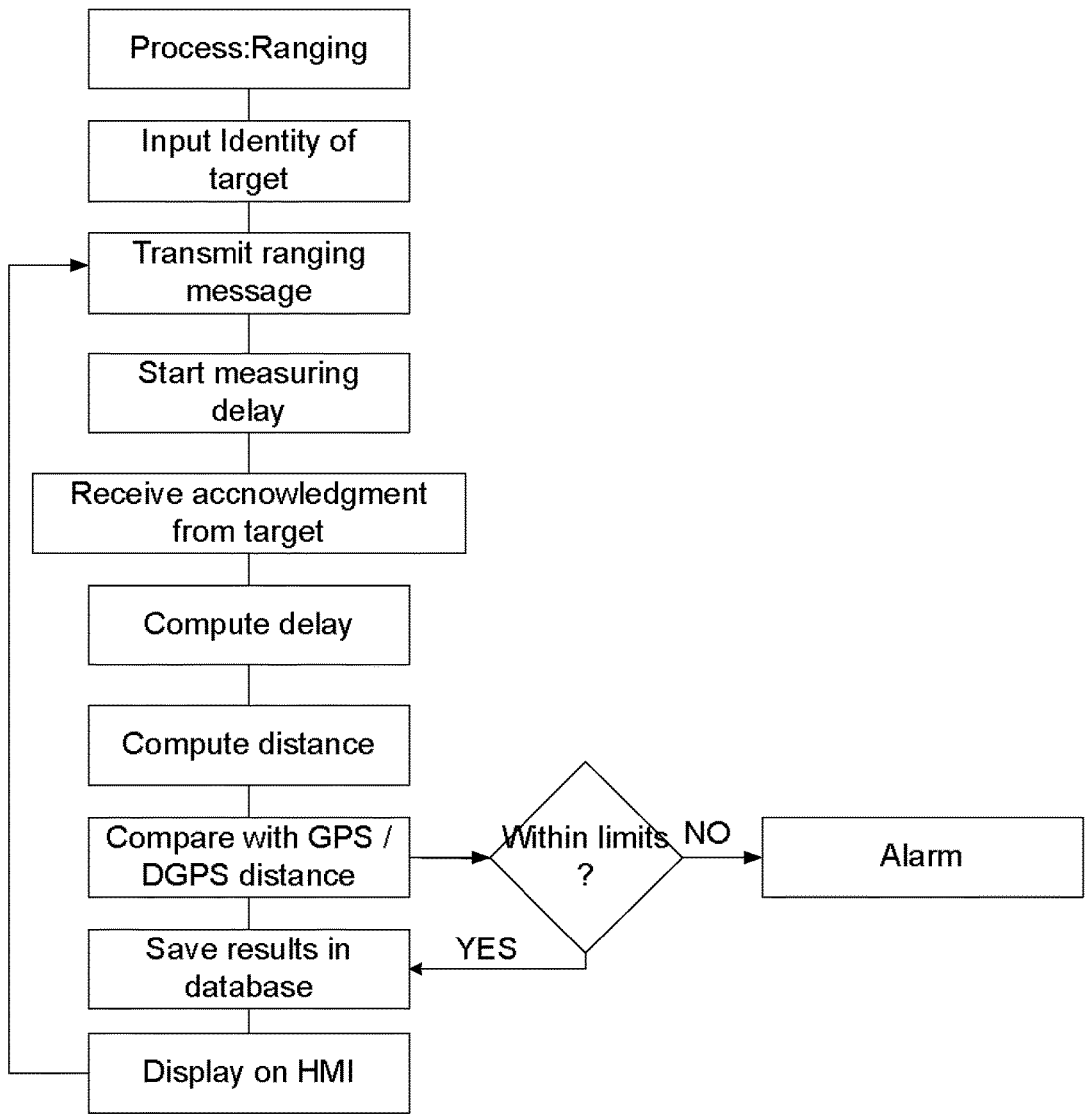
FIG. 4a-b shows flow charts of a ranging by use of the communication system according to the invention.
Figure 4B:
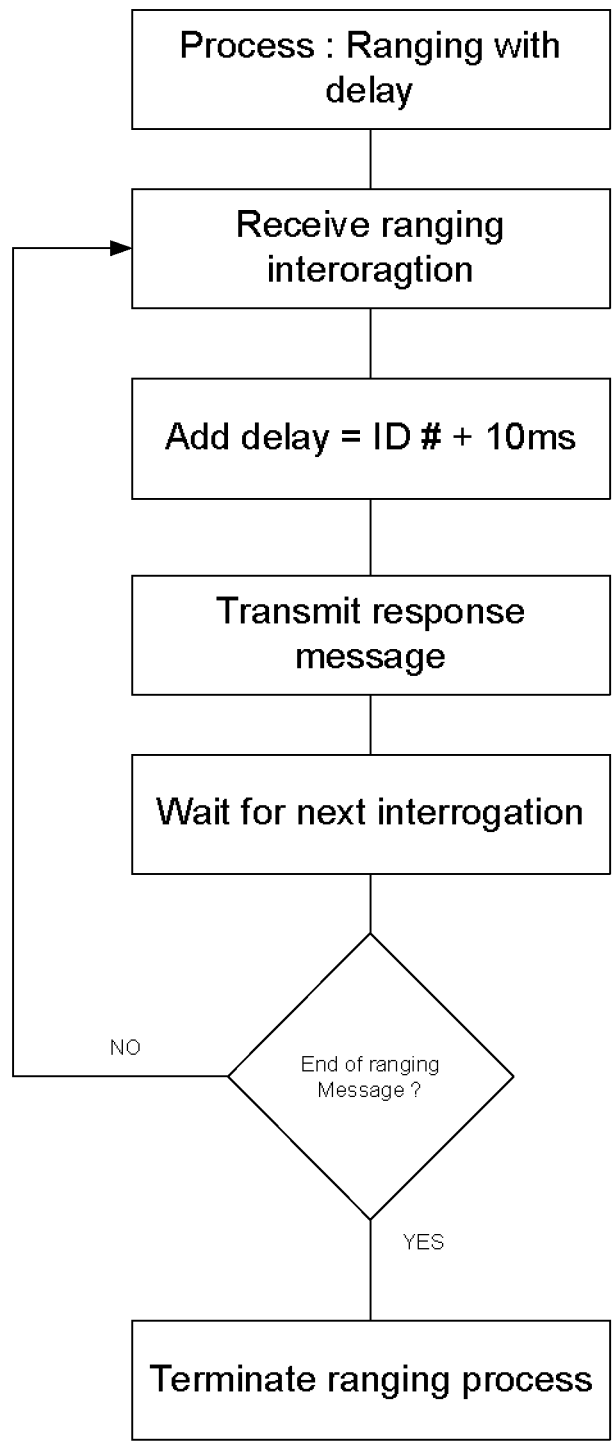

Reference is now made to FIGS. 4a-b which show two alternate embodiments of a ranging system. FIG. 4a shows an alternative where position data from GPS/DGPS are compared with positions obtained by measuring beam angels and time of flight of messages between two users 11. The first user issues an addressed message with identity with high priority from one user to targeted user. When the messages is received and decoded as a ranging message, the targeted user immediately responds with a confirmation message to the originating unit. Based on the time delay from transmission to reception, the distance and bearing between the antennas can be computed with high accuracy. This gives an additional measurement of the distance between the objects/units and can be used for backup or quality check of the measured GPS/DGPS distance. If the distances are within pre-defined limits the results are saved in the database and optionally presented on an interface. If the distances are not within pre-defined limits there is immediately set an alarm and all relevant users are informed. Accordingly, the user will now have two different estimates for the position of the target and can decide the correct position with higher integrity than by only using one positioning system.

A stream of addressed ranging messages can be transmitted for acquiring information from several users.

In FIG. 4b it is shown an alternative of the same ranging principle, where the ranging message is not using addressing to a specific unit. After at ranging message is transmitted responses from several units are allowed. Each responding unit introduces a controlled time delay before answering to avoid time slot collisions. The time delay is related to the identity of the answering unit in a unique way and is subtracted from the ranging measurement of the receiving unit in order to compute the correct time delay and thereby the distance to each and every responding unit. As for the first alternative the ranging measurements are compared with GPS/DGPS measurements for back-up or quality check and if the measurements are not within pre-defined limits an alarm is set.

To further increase the accuracy also phase measurements of the received signal can be used for both the alternatives.

The user control unit 101 is further preferably provided with means and/or software for locally generating differential correction signals for position identification, like GPS, which can be used by any user 11 in the network. This will provide higher accuracy for the position reports than can be obtained with, for example GPS alone, or by any available differential service in the area. This can be used as a second source for differential corrections. If the GPS differential correction signal falls out one can check if the last differential correction for the GPS is correct. The user control unit 101 is further preferably provided with an intelligent decision support system providing advice on solutions in order to reduce time used for taking decisions in case of problems. Typical operational support systems could be meteorological forecasts, wind and wave data from other parties in the network, position analysis and forecast systems, operational guidelines, working instructions, guidelines for problem solving, emergency plans, personnel databases, location system for personnel and other databases and systems that is necessary for efficient operation under different circumstances.

The communication system further preferably includes an integrated messaging system which is arranged for transmission of written messages or mail between all users 11 involved.

The communication system further includes communication unit for all users 11 to be able to speak to each other either by ordinary telephone systems or by speakerphones.

The system is further preferably provided with a document handling functionality, which is available in the user interface 103. This functionality handles processing of documents, sharing, reporting, approvals, manuals, etc.

The above mentioned personnel tracking can be based on RFID and distributed monitoring points.

A possible data source which can provide input to the system is a method and system for determining the position of marine vessels and similar objects as described in EP1735638, in the name of the applicant. This is a method for determining the relative position between two or more objects in a marine environment, including waterways, of which at least one object can be manoeuvred relative to one or more other objects. At least one interrogator is arranged on one or more of the objects and sends a radio wave signal to at least one transponder arranged on one or more of the other objects. The method make use of a FMCW radar in the interrogator, the use of the transponders for including identity tags into the signals to be reflected to the interrogator, and attitude determination. A system for this determination is also described. By using this system as input to the disclosed system and method one will get a high precision of positions of the user units in relation to each other.

Figure 5:
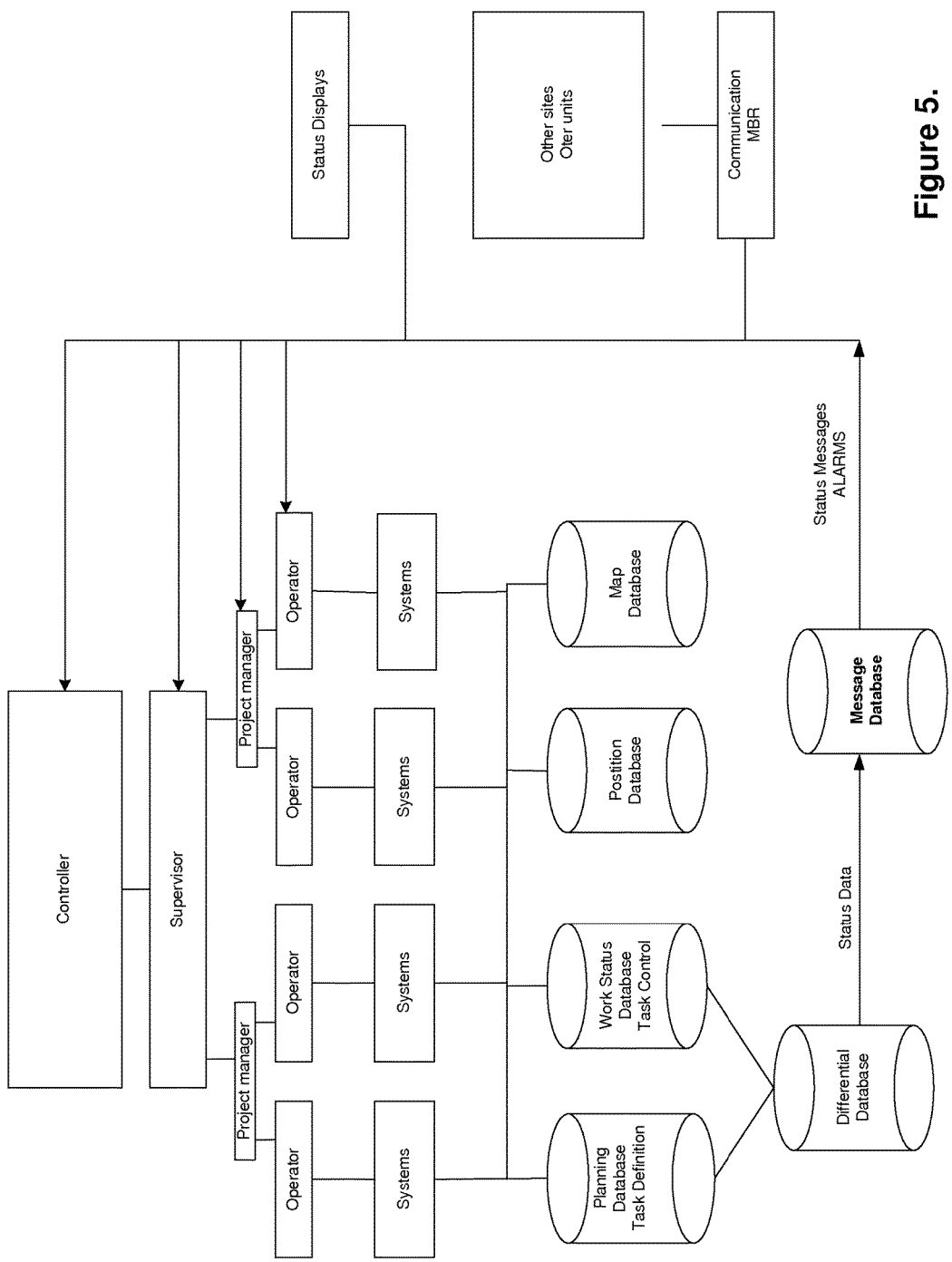
FIG. 5 shows an intelligent message system according to the present invention.

Reference is now made to FIG. 5 which illustrates a system for messaging, monitoring and verification of messages according to the disclosure.

SIMOPS operations usually involve a multitude of vessels, barges, fixed structures and other entities, and fast and efficient communication with high data volumes is a prerequisite for a successful operation. Normally all tasks to be carried out in an operation is planned well in advance, and all task have to be carefully monitored in order to check if progress is according to plan. As a large number of units are cooperating in solving complex tasks, it is of outmost importance that all units are up to date with operational information and possible deviations that have to be incorporated during execution of the operation. The system, with its high data throughput, can be used for high speed data communication between all units, thereby giving new and innovative possibilities for monitoring and verification of the operation at hand. With reference to FIG. 5 it will below be described how the system according to the disclosure may be used for enhanced monitoring and control in a SIMOPS operation.

Initially all task in the operation are planned in detail and described in a task description. All task descriptions are assembled in a planning database. Each task is identified with an identity number and associated with a set of messages used for monitoring the execution of the task. These messages will normally be one message for initiation of the task, one message for completion of the task, one message for indication of delay of the task and one message for indication of alarm if the task is not proceeding according to plan. More messages can be developed according to specific needs in the actual operation.

All tasks are planned with time schedules for start, execution and stop. The person or entity responsible for carrying out the task will confirm each milestone in the execution of the task by issuing a message giving the progress of the task. For example if task ID099 is defined by a lifting operation from a vessel to a platform starting at 0900 and stopping at 0920, this information will be available in the planning database. The operator will then be presented with this task by his user interface telling him to start the operation at 0900. The operator confirms the start of the operation at 0900 by sending a confirmation message to the task monitoring system. When finished at 0920 he will send a confirmation message indicating that the task has been successfully terminated. The monitoring system then check if the task is carried out according to plan and in this case reports a successful operation of task ID 099. This information is then saved in the operational database which will hold all information about how the tasks are actually carried out If the task is delayed, the operator reports the delay and a new planned time for ending the task. The task monitoring system detects the change between the planning database and the operational database and updates the rest of the tasks accordingly. Moreover, since there is a deviation between the planned operation and what is actually happening, a warning message is sent to an operation manager or supervisor. The supervisor may then immediately evaluate the situation and decide on necessary changes to the plan.

In more severe cases, where a task is going very wrong, the operator may issue an alarm message. The alarm message will then immediately alert the operation management and supervisors to the actual situation and appropriate actions may immediately be taken.

As all information about the operation and its development is now available as messages in several databases, this information may be distributed in real time between all parties and even distributed to other stakeholders that have interest in following up how the operation develops.

Using the disclosed system as the communication link ensures that high speed data communication is available between all parties and that all information is available in real time. In case of incidents even live video may be distributed to improve the decision making during a problematic event.

With reference to the architecture shown in FIG. 5 typically onboard one unit will consist of several project managers managing several operators which are managing several systems, like navigation, manoeuvring, propulsion, cranes, anchor handling and other systems, used in maritime operations. Each unit has a supervisor controlling the whole operation for the unit in question. In units performing several tasks even an additional controller may be necessary to monitor the development of the operation.

Each unit holds its specific planning database and will build its operational database as the operation progress. If differences between the planning database and the operational database occur, the deviations are saved in a differential database taking care of issuing deviation messages and alarms.

Deviation messages and alarms are then distributed to all parties and made available to supervisors, controllers and other entities on a need to know basis.

This monitoring and verification system depends on high speed data communication provided by the communication system disclosed herein and will greatly enhance the situation awareness and time to react in SIMOPS operations. As the information is available to all units simultaneously, all entities may cooperate in a very close and integrated manner in case of difficulties in carrying out the operation. This will greatly enhance the effectiveness and significantly reduce the risk potential of SIMOPS operations.

The disclosed system and method also improve safety management, where an embedded and integrated communication system may contribute to enhanced safety of operations and personnel. The safety management system will comprise information about safe distances and give alarms if vessels or units are too close for sufficient safety. The planning and safety system may also contain safe routing, i.e. define safe areas of operation and navigation which has to be observed. Alarms could automatically be triggered if hazardous situations arise because the safety distances become too small.

The system preferably also includes:
  means for increased resistance to interference and jamming, by null steering in the antenna lobe,
  means for plain installation and operation,
  logging facilities—replay of critical events,
  means for generating input data for simulation and training purposes,
  means for identifying personnel position by using RFID technology for monitoring personnel movement, i.e. when and where personnel moves through an identification portal. In this way personnel position data can be integrated in the information data base of the system. In case of an emergency it is important to know where all personnel are,
  means for alarming and position identification if Man Over Board (MOB) systems are activated. There exist commercial MOB systems which send a radio signal to a monitoring unit if a person falls into the water. The present system can be used to convey this information to other units, etc.

A modification of this communication system may be to measure path delay and compute the distance between units. The first unit may send a specially designed query message to the second unit asking it to retransmit the message together with the unit's position data, like GPS position. The time delay before receiving the retransmitted message can be used for computing the distance and the antenna beam angels can be used for computing the bearing. This will give an additional and independent method for range and position estimation compared with GPS.

A fixed unit with a known distance to the first unit may be used for calibrating and accuracy purposes. Measuring the distance to the fixed unit, typically a fixed platform with known distance and position will provide a correction factor for distance that can be applied for measurement toward other units as well.

The system may also be used for transmitting data like wind speed and wave heights to other units.

The unique lobe steering system can also be used for suppressing interfering signals by steering the antenna zero points towards the interfering source. This allows optimization of the signal to interference ratio in two ways, either by maximising the signal level or minimising the interfering signal level. As the antenna lobes and zeros are completely steerable by software control the maximum signal to interference ratio can be obtained by optimizing on both parameters at the same time.

The invention claimed is:

1. A method for setting up a maritime high speed broadband communication network between several users (11) cooperating in a maritime SIMOPS operation, which users are provided with a user unit (100) including a user control unit (101), communication unit (102), an interface unit (103) and a user interface (104), comprising the following steps:
  a) each user (11) performing a scan for other users (11) or issuing an interrogation message asking operative, location, heading, velocity and user identification status of other users via a phase steerable antenna (106) generating one narrow lobe,
  b) forming a network (110) via which the users (11) can communicate directly with each other via each user setting up a database including operative users (11) with respective positions, headings and velocities identified,
  c) calculating optimized transmission parameters, directly from one user (11) to another user (11) by measuring signal strength, signal-to-noise ratio, data throughput and other optional transmission parameters,
  d) optimizing direction of the narrow lobe of the phase steerable antenna (106) in both azimuth and elevation for best possible data throughput for each user (11) directly to the respective other users (11),
  e) reducing interference from reflected signals by performing at least one from the group consisting of (i)-(iv):
    (i) Pointing one antenna lobe directly at a transmitting user (11) and pointing one lobe towards a reflection point, and introducing an additional phase shift on measured reflected signal in such a way that it will always add the reflected signal to the direct signal;
    (ii) calculating direction and position of a reflection point based on position of the transmitting and receiving user (11), distance between transmitting and receiving user (11) and antenna height at both sides, and generating one or more nulls in the steerable phase antenna's diagram in direction of the reflection point;
    (iii) monitoring characteristics of a reflection point by establishing a dedicated monitoring channel using a reflection path, either by monitoring received signal only, or by using a dedicated pilot signal with known parameters and modulation transmitted from the transmitting user (11); and
    (iv) splitting the antenna lobe of the receiving user (11) into two portions, aligning one antenna lobe portion with direct free space path and the other antenna lobe portion directly to a reflection point, and delaying the direct signal to be in phase with the reflected signal, thereby creating a constructive interference between the direct and the reflected signal and canceling the negative influence of the reflected signal
  f) controlling the phase steerable antennas (106) for users (11) communicating directly with each other based on optimized transmission parameters from step (c), antenna lobe directions from step (d), and reducing interference from reflected signals from step (e) to achieve high gain in both azimuth and elevation for the generated narrow lobes,
  g) repeating steps (a)-(f) at predetermined intervals.

2. The method of claim 1, wherein step a) includes performing a search both in azimuth and elevation, via one narrow lobe, to cover all possible transmission paths directly between respective users (11).

3. The method of claim 2, comprising performing the search over 360 degrees in azimuth and 90 degrees in elevation.

4. The method of claim 1, wherein step (f) includes one or more of the following steps:
increasing transmit power or reducing transmission speed to achieve optimized transmission parameters for direct communication between respective users (11),
steering the narrow lobe of the phase steerable antenna (106) to a direction having highest energy content between the respective users (11), and
forming the narrow lobe of the phase steerable antenna (106) by individually controlling the phase of each single antenna element in the narrow lobe phase steerable antenna (106).

5. The method of claim 4, comprising one or both of:
forming a narrow lobe phase steerable antenna (106) beam having one or more deep nulls, as well as narrow beams, and
tailoring a narrow lobe phase steerable antenna (106) directional diagram to the most suitable form for the actual application.

6. The method of claim 1, comprising generating several main lobes in different directions in order to simultaneously communicate directly with several different users (11).

7. The method of claim 1, comprising exchanging data and information directly between the respective users (11) by software controlled network architecture including point-to-point, point-to-multipoint or meshed network.

8. The method of claim 7, comprising combining the different network architectures if point-to-point is not possible, by setting up a meshed network for reaching users (11) not being directly available by point-to-point.

9. The method of claim 7, comprising establishing a mesh network and transmitting a prioritized message through several routes via several other users (11) at the same time.

10. The method of claim 9, comprising using controlled delay in each unit of the mesh network to avoid collision between messages from different routes and ensuring that the receiving user receives all messages from the different routes in a controlled manner.

11. The method of claim 1, comprising the step of checking identity or encoding/decoding of signals.

12. The method of claim 1, comprising limiting information or data flow by marking separate messages with a priority designation, the messages being processed in order of relative degree of priority.

13. The method of claim 12, wherein if throughput of data is determined to be low, messages are prioritized according to the priority designation to prioritize the most important messages.

14. The method of claim 1, comprising one or more of the following steps:
actively monitoring communication channels and using only free channels, thereby avoiding interference with other systems, and
actively compensating beam steering algorithms with regard to movement of the users (11) by using information from a movement sensor in order to maintain a correct antenna lobe position in both azimuth and elevation.

15. The method of claim 1, comprising using geographical position data for each user (11) to select frequencies and power levels for an actual area and automatically controlling the phase steerable antenna (106) according to the selected frequencies and power levels.

16. The method of claim 1, comprising measuring path delay and computing the direct distance between the respective users (11) or measuring beam angles and time of flight of messages directly between respective users (11) and computing direct distance between the respective users (11).

17. The method of claim 1, comprising locally generating differential correction signals for position identification which can be used by any user (11) in an associated network.

18. The method of claim 1, comprising updating a user interface with received data at predefined periods.

19. The method of claim 1, comprising measuring the distance directly from a user (11) to one or more fixed units with known distances to provide a correction factor for distance that can be applied for measurement toward other users.

20. The method of claim 1, comprising suppressing interfering signals by steering antenna zero points towards an interfering source or adjusting lobe elevation to an optimum interference free angle for reception.

21. The method of claim 1, comprising optimizing the signal-to-interference ratio by either maximising the signal level or minimising the interfering signal level.

22. The method of claim 1, wherein the step (e) of reducing interference is via sub-step (iv), comprising:
the receiving user (11) pointing a narrow lobe directly at the reflection point,
analysing the received signal and measuring predetermined characteristic parameters for the reflection point,
creating a model of behaviour of reflecting surface and reflected signal,
using the model to estimate correction signals, and
using the estimated correction signals for correction of a main signal.

23. The method of claim 1, wherein the step (e) of reducing interference is via sub-step (iv), comprising:
the transmitting user (11) transmitting a dedicated carrier modulated signal with a known code word sequence directly towards the reflection point,
the receiving user (11) recording the signal after the signal is reflected by a reflecting surface,
generating an estimated correction signal by correlating, the received signal and the transmitted signal, and
correcting a main signal with the estimated correction signal.

24. The method of claim 1, comprising predicting the position of the users (11) based on available information for position, heading and velocity and directing the antenna lobe toward the predicted position.

25. The method of claim 1, comprising the step of performing ranging between the respective users (11) by:
transmitting one or more addressed ranging message from one user (11) to at least one other user (11),
receiving users (11) responding with confirmation messages to the transmitting user (11) after receipt and decoding a message, and
calculating the distance between transmitting user (11) to receiving user (11) based on time delay from transmission to receipt.

26. The method of claim 1, comprising performing ranging between the respective users (11) by:
transmitting one or more ranging message from one user (11) to one or more named other user (11),
responding users (11) introducing a controlled delay corresponding to their identity and responding with confirmation messages including controlled delay and identify to the transmitting user when the respective messages are received and decoded as a ranging messages, and calculating distance between the respective users (11) based on time delay from transmission to reception and controlled time delay.

27. The method of claim 25, wherein phase measurements of the received signal are used to increase the accuracy of the ranging.

28. The method of claim 25, comprising comparing the calculated distance with measured GPS or DGPS distance.

29. The method of claim 1, comprising reducing interference by:
measuring or identifying noisy frequencies and directions to interference sources and storing the information in a database,
using adaptive optimization algorithm to analyse the interference source and direction based on one or more of the following interference characteristics: frequency, amplitude, timing, duration and history, and
controlling the phase steerable antenna (106) to form nulls in the direction of the interference source or by forming of a signal adapted to counteract the interference signal, and thereby block the signal from the interference sources.

30. The method of claim 1, comprising detecting interference from electric equipment or faulty transmitters onboard other users (11) includes:
searching for the direction of one or more interference sources originating from one or more users (11) by phase steerable antennas (106), and
computing position and distance to the interference source using information from the users (11).

31. The method of claim 30, wherein the position and distance to the interference sources are used to control the phase steerable antenna (106) to form nulls in the direction of the one or more interference sources and thereby blocking the signal from the interference sources.

* * * * *